(12) United States Patent
Oishi (10) Patent No.: US 6,598,697 B2
(45) Date of Patent: Jul. 29, 2003

(54) RACK-AND-PINION TYPE STEERING APPARATUS WITH PRESSURE EQUALIZATION SYSTEM

(75) Inventor: Wilson Yukio Oishi, São Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 09/917,273

(22) Filed: Jul. 30, 2001

(65) Prior Publication Data

US 2002/0017419 A1 Feb. 14, 2002

(30) Foreign Application Priority Data

Jul. 28, 2000 (BR) .............................................. 0003428

(51) Int. Cl.⁷ ................................................ B62D 5/06
(52) U.S. Cl. ........................ 180/428; 180/427; 74/422; 74/388 PS
(58) Field of Search ............................. 74/422, 388 PS; 180/427, 428; 280/93, 514, 671

(56) References Cited

U.S. PATENT DOCUMENTS 4,573,399 A * 3/1986 Wilson ......................... 92/110
4,721,175 A * 1/1988 Butler ......................... 180/428
5,069,080 A * 12/1991 Simon ......................... 74/422
5,379,856 A * 1/1995 Blee ............................ 180/400
5,499,550 A * 3/1996 Westphal et al. ....... 280/93.514
5,855,375 A * 1/1999 Wilcox et al. .............. 277/551
5,890,394 A * 4/1999 Anderson ................... 180/428

* cited by examiner

Primary Examiner—Lesley D. Morris
Assistant Examiner—Paul Royal, Jr.
(74) Attorney, Agent, or Firm—Liniak, Berenato & White (57) ABSTRACT

This invention refers to an improved rack-and-pinion type steering apparatus for automotive vehicles comprising a cylindrical housing attached to a body structure of the vehicle, and a steering rack shaft mounted within the housing for sliding movement therethrough. Opposite ends of the steering rack shaft are coupled to left and right tie rods through ball joint assemblies to steer a set of road wheels in accordance with lateral displacement of the rack shaft. The rack-and-pinion type steering apparatus further includes a pair of protective boots of elastomeric material, each defining left and right ball joint chambers for sealing a steering gear and components of the ball joint assemblies against debris and foreign fluids. Furthermore, the steering apparatus of the present invention includes a pressure equalization system for equalizing pressure in the left and right ball joint chambers.

9 Claims, 6 Drawing Sheets

RACK-AND-PINION TYPE STEERING APPARATUS WITH PRESSURE EQUALIZATION SYSTEM

BACKGROUND OF THE INVENTION

1. Field of the Invention

The present invention relates to steering systems for automotive vehicles, and more particularly to a rack-and-pinion type steering apparatus having a pressure equalization system.

2. Description of the Prior Art

Rack-and-pinion type steering systems of automotive vehicles are well known in the prior art. Typically, rack-and-pinion type steering apparatus comprises a cylindrical steering gear housing attached to a body structure of the vehicle, and a steering rack shaft mounted within the housing for sliding movement therethrough. Opposite ends of the steering rack are coupled to left and right tie rods through ball joint assemblies to steer a set of road steering wheels in accordance with lateral displacement of the rack shaft. The rack-and-pinion type steering apparatus further includes a pair of protective boots of elastomeric material, each coupled at their one ends with the opposite ends of the tubular housing and at their other ends with the tie rods to encompass each joint assembly of the tie rods with the rack member, thus defining left and right ball joint chambers for sealing a steering gear and components of the ball joint assemblies against debris and foreign fluids.

However, the complete tight sealing provided by these protective boots brings an undesirable problem when the rack shaft is actuated to move the steering wheels of the vehicle to the right or to the left in accordance with the displacement of the rack shaft. Because each of the protective boots is fixed to the housing at one end and coupled with the movable tie rod at the other end in a condition where a steering wheel is retained in a position corresponding to straight ahead travel, during the displacement of the rack shaft one of the protective boots stretches, creating a negative pressure in the associated ball joint chamber, while the other protective boot compresses, creating a positive pressure in the associated ball joint chamber, thus causing a pressure differential between the left and right ball joint chambers that increases steering wheels to turning, quickly causes deterioration of the protective boots and even impairs the satisfactory operation of the steering apparatus.

Prior art teaches a number of means to eliminate this problem. One of such means consists of a valve means provided in these protective boots that communicates the interior of the protective boot with its exterior, allowing the relief of the pressure, or admitting air in the ball joint chamber during the compression thereof. This structure, however, did not prove itself efficient as it allows the entry of impurities with the air and, further, it is not cost effective, not durable and additionally causes damage to the protective boots in the places where these valves are attached.

SUMMARY OF THE INVENTION

The present invention provides an improved rack-and-pinion type steering apparatus for an automotive vehicle. The steering apparatus in accordance with the present invention comprises a cylindrical steering gear housing attached to a body structure of the vehicle, and a steering rack shaft mounted within the housing for sliding movement therethrough. Opposite ends of the steering rack shaft are coupled to left and right tie rods through ball joint assemblies to steer a set of road steering wheels in accordance with lateral displacement of the rack shaft. The rack-and-pinion type steering apparatus further includes a pair of protective boots of elastomeric material, each coupled at their one ends with the opposite ends of the tubular housing and at their other ends with the tie rods to encompass each joint assembly of the tie rods with the rack shaft, thus defining left and right ball joint chambers for sealing a steering gear and components of the ball joint assemblies against debris and foreign fluids. Furthermore, the steering apparatus of the present invention includes a pressure equalization system between the left and right ball joint chambers, so as to maintain substantially equal pressure therewithin. The pressure equalization system of the steering apparatus in accordance with the present invention includes an air path fluidly interconnecting the left ball joint chamber with the right ball joint chamber. The air path includes a longitudinal passage formed in the steering rack shaft, which through the communication passages in ball joint casings secured at the opposite ends of the steering rack shaft, is fluidly interconnects the left and right ball joint chambers.

Therefore, the improved rack-and-pinion type steering apparatus for the automotive vehicle of the present invention substantially improves operation of the steering apparatus and durability of the protective boots over the prior art in a way efficient and inexpensive in manufacturing.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
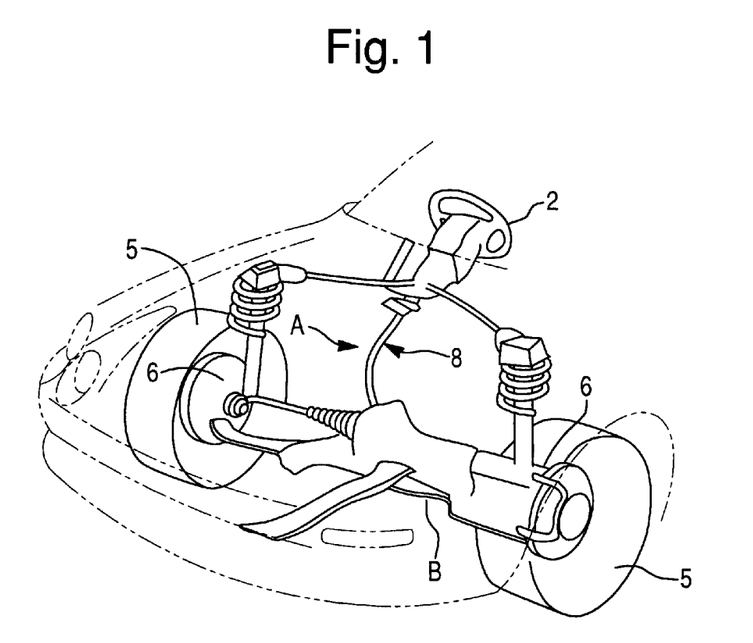
FIG. 1 is a perspective view of a steering apparatus mounted on an automotive vehicle.

FIG. 1 of the drawings that shows the preferred embodiment of the invention, illustrates a steering apparatus A of the rack-and-pinion type mounted on an automotive vehicle, which is equipped with a steering wheel 2 to travel on a road. In the steering apparatus A, a steering effort is directly applied to the steering wheel 2 and transmitted to a set of steering road wheels 5 through the steering apparatus A to steer the road wheels.

Figure 2:
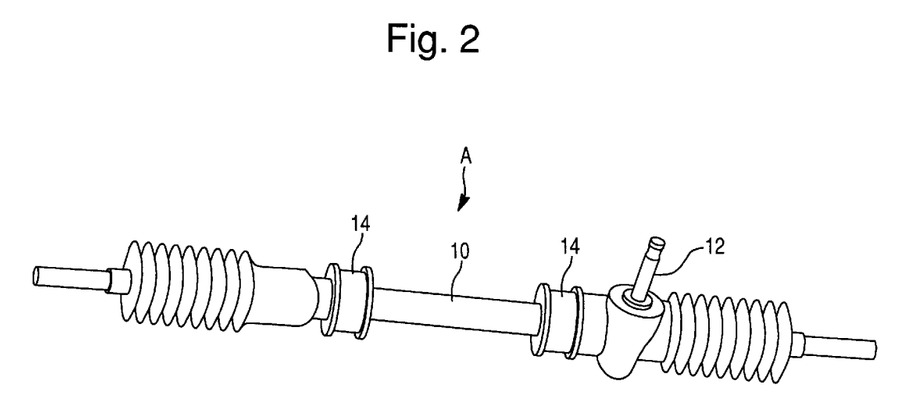
FIG. 2 is a perspective view of a rack-and-pinion type steering apparatus for an automotive vehicle.
Figure 3:
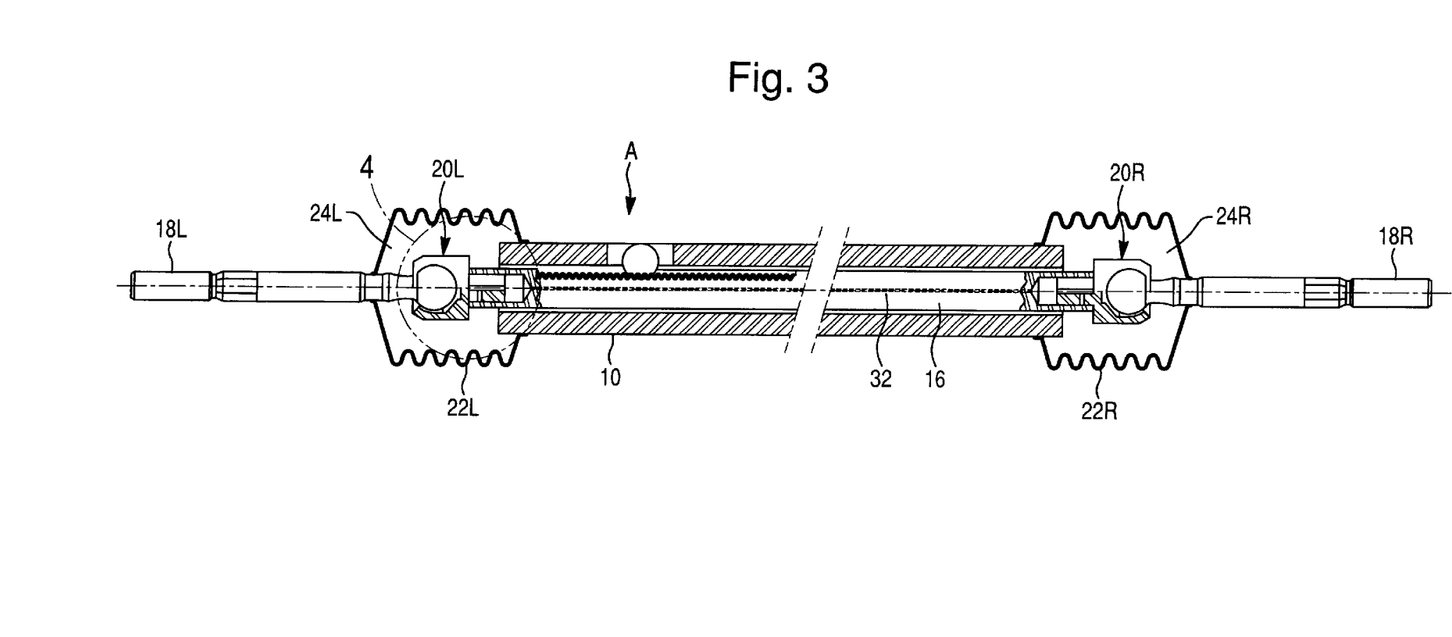
FIG. 3 is a cross-sectional view of a rack-and-pinion type steering apparatus in accordance with the present invention.

As shown in FIGS. 1, 2 and 3, the steering mechanism A comprises a tubular housing 10 mounted on a vehicle body structure B via brackets 14, a pinion shaft 12 having a pinion 13 and operatively connected to the steering wheel 2 through a steering shaft assembly 8, a steering rack shaft 16 supported within the housing 10 to be laterally displaced in accordance with rotation of the pinion shaft 12, a pair of left and right tie rods 18L and 18R respectively, each connected at their one ends to the opposite ends of rack shaft 16 by means of left and right substantially identical ball joints 20L and 20R respectively, and at their other ends to a pair of knuckle arms 6 to steer the road wheels 5 in accordance with lateral displacement of the rack shaft 16. The rack shaft 16 has rack teeth 17 formed thereon, which are meshed with the pinion 13 so that the rotation of the pinion shaft 12 is converted into a sliding motion of the rack shaft 16, and the sliding motion of the rack shaft 16 is transferred to the left and right steering wheels 5 through the tie rods 18L and 18R to steer the vehicle.

Figure 4:
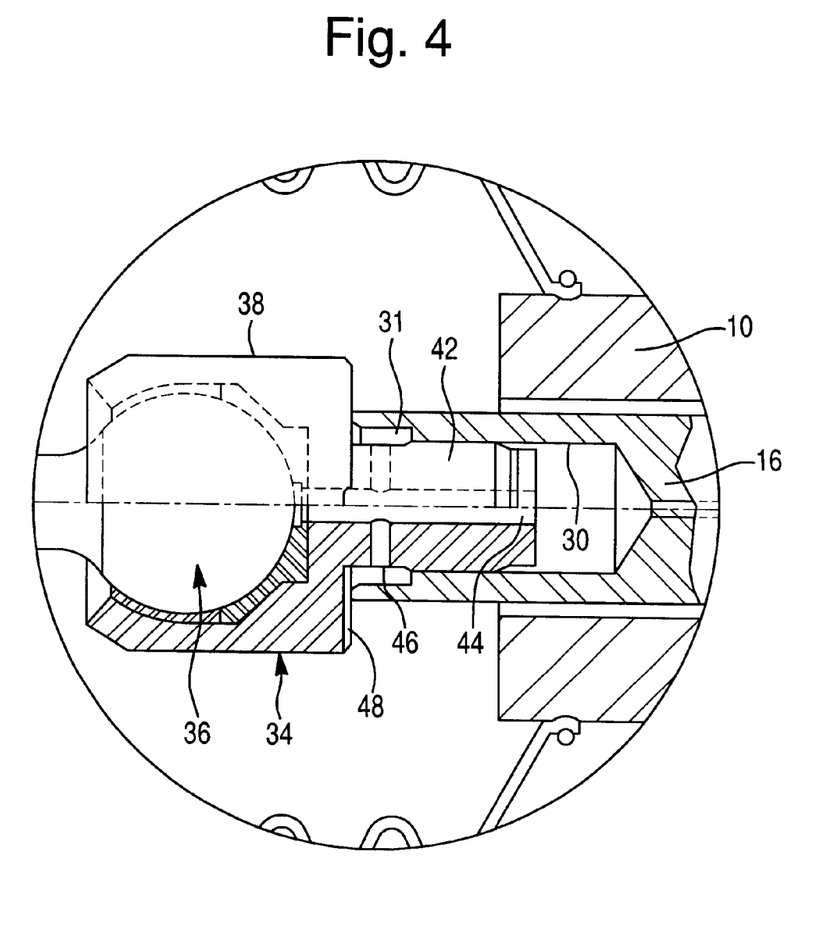
FIG. 4 is an enlarged cross-sectional view of a ball joint assembly shown by encircled region 4 of FIG. 3.
Figure 5:
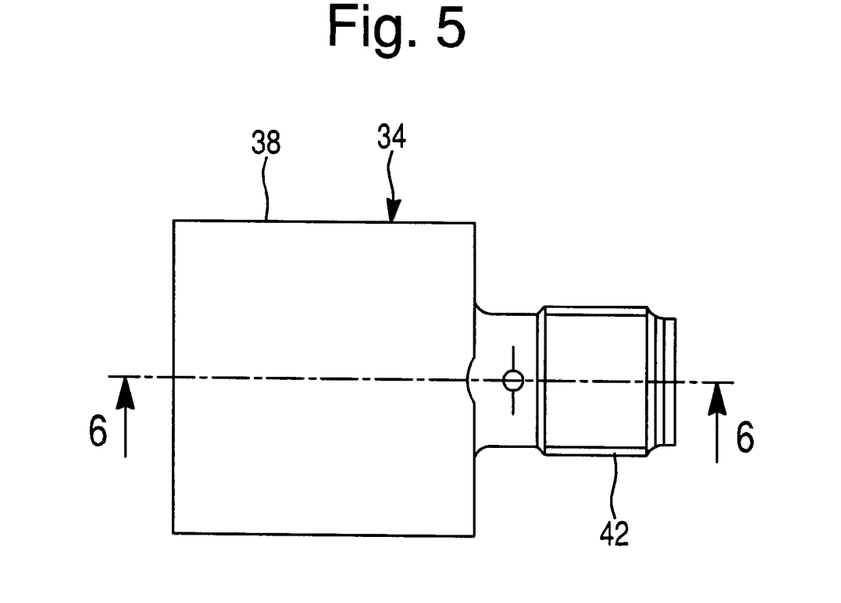
FIG. 5 is a side view of a ball joint casing of a ball joint assembly for the steering apparatus in accordance with the present invention.
Figure 6:
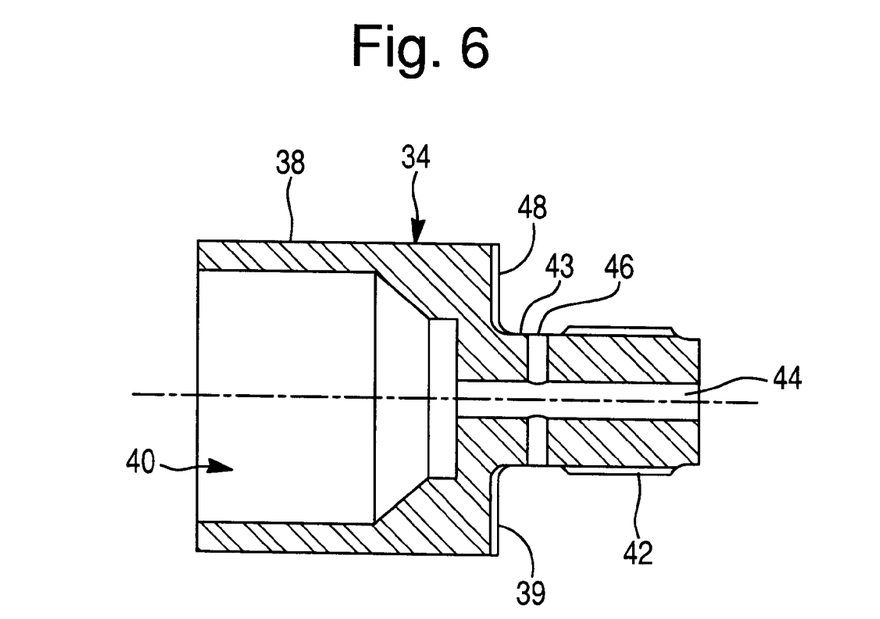
FIG. 6 is a view taken along the line 6—6 of FIG. 5.

The left and right ball joints 20L and 20R are substantially identical, therefore, only As illustrated in FIGS. 3 and 4, each of the left and right ball joints 20L and 20R includes a ball joint casing 34 and a ball pin 36 pivotally slidable within the casing 34. As illustrated in FIGS. 4–6, the ball joint casing 34 includes a socket element 38 defining a socket cavity 40 for receiving the ball pin 36, and a mounting rod 42 extending from the socket element 38 for fixing the ball joint casing 34 to the associated end of the steering rack shaft 16. For this purpose, as shown in detail in FIG. 7, each of the opposite ends of the steering rack shaft 16 is provided with a bore 30 receiving the mounting rod 42 of the ball joint casing 34, and a stepped bore 31 disposed at the very end of the rack shaft 16 adjacent to the bore 30.

The rack-and-pinion type steering apparatus A further includes a pair of protective boots 22L and 22R of flexible elastomeric material, each coupled at their one ends with the opposite ends of the tubular housing 10, and at their other ends with the tie rods 18L and 18R to encompass each joint assembly 20L and 20R of the tie rods 18L and 18R with the rack shaft 16, thus defining left and right ball joint chambers 24L and 24R respectively for sealing the steering gear housing 10 and components of the ball joint assemblies 20L and 20R against debris and foreign fluids.

The left-hand dust boot 22L is coupled with the tie rod 18L and tubular housing 10 in a condition where the steering wheel 2 is retained in a position corresponding to straight ahead travel. In this instance, the left-hand dust boot 22L is stretched in a predetermined amount and creates a negative pressure in the associated ball joint chamber 24L. Similarly, the right-hand dust boot 22R is coupled with the tie rod 18R and tubular housing 10 in a condition where the steering wheel 2 is retained in the position corresponding to straight ahead travel. In this instance, the right-hand dust boot 22R is compressed in a predetermined amount and creates a positive pressure in the associated ball joint chamber 24R.

Figure 7:
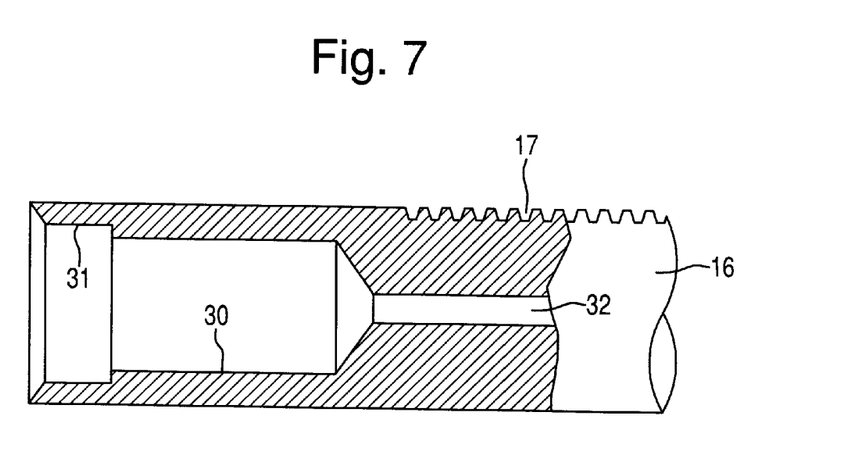
FIG. 7 is a partial sectional view of an end portion of a steering rack shaft in accordance with the present invention.

In order to alleviate this problem, the steering apparatus A of the present invention includes a pressure equalization system for maintaining substantially equal pressure between the left and right ball joint chambers 24L and 24R. The pressure equalization system of the steering apparatus A includes an air tract fluidly interconnecting the left ball joint chamber 24L with the right ball joint chamber 24R. In accordance with the preferred embodiment of the present invention, the passageway means includes a longitudinal passage 32 formed through the steering rack shaft 16 between opposite ends thereof and opened to the bores 30, as illustrated in FIGS. 3 and 7. In turn, the ball joint casing 34 has a series of passageways providing a fluid communication between the longitudinal passage 32 of the steering rack shaft 16 and the ball joint chamber 24L or 24R. These passageways, shown in detail in FIGS. 4–6, include a central passage 44 formed trough the mounting rod 42 of the ball joint casing 34 and at least one transverse bore 46 extending substantially radially inwardly from an outer peripheral surface 43 of the mounting rod 42 to terminate at the central passage 44. Preferably, the mounting rod 42 has four transverse bores 46. It will be appreciated that any other number of the transverse bores 46 will be within the scope of the present invention. The transverse bores 46 is arranged such a way that when the mounting rod 42 of the casing 34 is mounted within the bore 30 of the rack shaft 16, the transverse bores 46 are in fluid communication with the stepped bore 31, thus fluidly interconnecting the central passage 44 with the stepped bore 31.

Furthermore, a rear face surface 39 of the ball joint casing 34 is provided with at least one communication groove 48 extending substantially radially outwardly from the outer peripheral surface 43 of the mounting rod 42 for fluidly interconnecting the stepped bore 31 with the ball joint chamber 24L or 24R. Preferably, the rear face surface 39 has four communication grooves 48. It will be appreciated that any other number of the communication grooves 48 will be within the scope of the present invention.

Therefore, an air path fluidly interconnecting the left ball joint chamber 24L with the right ball joint chamber 24R is provided.

In operation, when a vehicle operator turns the steering wheel 2 to steer the vehicle, e.g. to the right, the right-hand dust boots 22R is compressed in a predetermined amount and creates a positive pressure in the associated ball joint chamber 24R. When this happens, pressurized air from the right ball joint chamber 24R travels through the communication grooves 48, the stepped bore 31, transverse bores 46 and the central passage 44 of the right ball joint assembly 20R into the bore 30 at the right end of the steering rack shaft 16, then into the longitudinal passage 32 of the steering rack shaft 16. From the longitudinal passage 32 pressurized air further travels to the bore 30 at the left end of the steering rack shaft 16, then through the central passage 44, the transverse bores 46, the stepped bore 31 and the communication grooves 48 of the left ball joint assembly 20L enters the left ball joint chamber 24L, thus equalizing air pressure in the left and right ball joint chambers 24L and 24R.

Therefore, the steering apparatus for the automotive vehicle in accordance with the present invention represents the improved rack-and-pinion type steering apparatus that substantially improves operation of the steering apparatus and durability of the protective boots over the prior art in a way efficient and inexpensive in manufacturing.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A steering apparatus for an automotive vehicle, said apparatus comprising:

an elongated hollow housing adapted to be mounted on a body structure of the vehicle;

a steering shaft mounted within said housing for sliding movement therethrough, said steering shaft having opposite left and right ends extending from said housing;

left and right steering members for transmitting motion of said steering shaft to steerable vehicle wheels;

said left and right steering members operatively coupled to said left and right ends of said steering shaft through left and right joint assemblies;

left and right protective boots sealing said joint assemblies and associated end of said steering shaft;

said left protective boot defines a left joint chamber and said right protective boot defines a right joint chamber; and an air tract fluidly interconnecting said left joint chamber with said right joint chamber for equalizing pressure in said left and right joint chambers;

said air tract includes a longitudinal passage formed in said steering shaft and a communication passage formed in a joint casing of each of said left and right joint assemblies, said joint casing is secured to one of said ends of said steering shaft, said communication passage is in fluid communication with said longitudinal passage formed in said steering shaft for establishing fluid communication between said left ball joint chamber and said right ball joint chamber;

wherein said communication passage formed in said joint casing of each of said left and right ball joint assemblies includes a central passage formed through a mounting rod of said ball joint casing and at least one transverse bore extending substantially radially from said central passage through said mounting rod for providing fluid communication between said central passage and one of said left ball joint chamber and said right ball joint chamber, said central passage being in direct fluid communication with said longitudinal passage formed in said steering shaft.

2. The steering apparatus as defined in claim 1, wherein each said protective boots is made of a flexible material and is formed in the shape of a bellow.

3. The steering apparatus as defined in claim 1, wherein said joint assemblies are ball joint assemblies.

4. A steering apparatus for an automotive vehicle, said apparatus comprising:

an elongated hollow housing adapted to be mounted on a body structure of the vehicle;

a steering rack shaft mounted within said housing for sliding movement therethrough, said steering rack shaft having opposite left and right ends extending from said housing;

left and right tie rods for transmitting motion of said rack shaft to steerable vehicle wheels;

said left tie rod is connected to said left end of said rack shaft through a left ball joint assembly;

said right tie rod connected to said right end of the rack shaft through a right ball joint assembly;

each of said left and right ball joint assemblies has a ball joint casing receiving a ball member;

left and right protective boots covering said ball joint assemblies and associated end of said rack shaft, each said protective boots is made of a flexible material and is formed in the shape of a bellow;

said left protective boot defines a left ball joint chamber housing said left ball joint assembly and is coupled at one end to said left tie rod and at the other end to said tubular housing;

said right protective boot defines a right ball joint chamber housing said right ball joint assembly and is coupled at one end to said right tie rod and at the other end to said tubular housing; and an air tract fluidly interconnecting said left ball joint chamber with said right ball joint chamber, wherein said air tract including:

a longitudinal passage formed in said steering rack shaft; and a communication passage formed in each of said boll joint casing, said communication passage providing fluid communication between said left ball joint chamber and said right ball joint chamber through said longitudinal passage in said rack shaft, said communication passage formed in said ball joint casing of each of said left and right ball joint assemblies includes a central passage formed through a mounting rod of said ball joint casing and at least one transverse bore extending substantially radially from said central passage through said mounting rod for providing fluid communication between said central passage and one of said left ball joint chamber and said right ball joint chamber, said central passage being in direct fluid communication with said longitudinal passage formed in said steering shaft.

5. A ball joint assembly operatively coupling a first member and a second member for articulated motion therebetween, said ball joint assembly comprising:

a ball joint casing receiving a ball member, said casing secured to said first member at one end thereof, said ball member mounted to said second member;

a protective boot defining a ball joint chamber and sealing said ball joint assembly; and a communication passage formed in said boll joint casing, said communication passage providing fluid communication between said ball joint chamber and an area exterior to said chamber;

said communication passage formed in said ball joint casing includes a central passage formed through a mounting rod of said ball joint casing and at least one transverse bore extending substantially radially outwardly from said central passage through said mounting rod for providing fluid communication between said central passage and said ball joint chamber.

6. The ball joint assembly as defined in claim 5, wherein said first member has a longitudinal passage therethrough in direct fluid communication with said central passage of said communication passage formed in said boll joint casing.

7. The ball joint assembly as defined in claim 6, wherein said first member is coupled to a second ball joint assembly at the other end thereof, said second ball joint assembly is disposed in a second ball joint chamber defined by a second protective boot sealing said second ball joint assembly, said second ball joint assembly comprising:

a second ball joint casing receiving a second ball member, said second casing secured to said first member at the other end thereof a second protective boot defining a second ball joint chamber and sealing said second ball joint assembly; and a second communication passage formed in said second ball joint casing, said second communication passage is in fluid communication with said communication passage formed in said boll joint casing for establishing fluid communication between said ball joint chamber and said second ball joint chamber, wherein said communication passage formed in said second ball joint casing includes a central passage formed through a mounting rod of said second ball joint casing and at least one transverse bore extending substantially radially outwardly from said central passage through said mounting rod for providing fluid communication between said central passage and said second.

8. The ball joint assembly as defined in claim 7, wherein said longitudinal passage through said first member is in fluid communication with said central passage of said communication passage formed in said boll joint casing at one end thereof and said central passage of said second communication passage formed in said second boll joint casing at the other end thereof.

9. The ball joint assembly as defined in claim 5, wherein said protective boot is made of a flexible material and is formed in the shape of a bellow.

* * * * *